(12) United States Patent
Tanaka et al.

(10) Patent No.: US 8,981,249 B2
(45) Date of Patent: Mar. 17, 2015

(54) JOINING STRUCTURE AND METHOD OF METAL WORKS

(75) Inventors: Chikara Tanaka, Hiroshima (JP);
Katsuya Himuro, Hiroshima (JP);
Yoichiro Kitahara, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 1884 days.

(21) Appl. No.: 12/020,732

(22) Filed: Jan. 28, 2008

(65) Prior Publication Data

US 2008/0237203 A1   Oct. 2, 2008

(30) Foreign Application Priority Data

Mar. 28, 2007 (JP) ................. 2007-085401

(51) Int. Cl.
*B23K 26/20* (2014.01)
*B23K 31/02* (2006.01)
*C09J 5/06* (2006.01)

(52) U.S. Cl.
CPC ............ B23K 26/203 (2013.01); C09J 5/06 (2013.01); *B23K 2201/006* (2013.01); *B23K 2201/185* (2013.01); *C09J 2400/163* (2013.01)
USPC ...................... 219/100; 219/121.64

(58) Field of Classification Search
CPC ...... B23K 26/246; B23K 26/30; B23K 26/28; B23K 26/26; B23K 26/3233
USPC .................... 219/100, 121.64, 121.63, 121.6; 228/176; 156/272.8
See application file for complete search history.

(56) References Cited

U.S. PATENT DOCUMENTS

| | | | | |
|---|---|---|---|---|
| 3,485,996 A | * | 12/1969 | Chiou et al. | 219/121.63 |
| 3,967,091 A | * | 6/1976 | Vaughan et al. | 219/92 |
| 3,972,111 A | * | 8/1976 | Dash | 29/458 |
| 4,258,100 A | * | 3/1981 | Fujitani et al. | 428/316.6 |
| 4,636,609 A | * | 1/1987 | Nakamata | 219/121.64 |
| 4,682,002 A | * | 7/1987 | Delle Piane et al. | 219/121.64 |

(Continued)

FOREIGN PATENT DOCUMENTS

| | | |
|---|---|---|
| EP | 0945475 A1 | 9/1999 |
| GB | 915008 | 1/1963 |

(Continued)

OTHER PUBLICATIONS

European Search Report; EP08004024; Jul. 14, 2008.

(Continued)

*Primary Examiner* — Henry Yuen
*Assistant Examiner* — Jimmy Chou
(74) *Attorney, Agent, or Firm* — Studebaker & Brackett PC

(57) ABSTRACT

A gap is provided at joining faces of a pair of metal works with an uneven shape when the metal works contact one another for joining. An adhesive agent having a chain-reacting curing reaction function is disposed within the gap. The adhesive agent is cured by an autogenously-generated curing reaction heat caused by an outer energy and an additional heat that is successively generated by the autogenously-generated curing reaction heat within the adhesive agent. A welding portion, where the works contact one another substantially directly, is welded by a laser beam, and the above-described energy for causing the autogenously-generated curing reaction heat for the adhesive agent is provided by the laser beam. Accordingly, a joining structure and method of metal works that can have less limitation in a joining location is provided.

1 Claim, 4 Drawing Sheets

(56) References Cited

U.S. PATENT DOCUMENTS

| | | | |
|---|---|---|---|
| 4,735,847 A * | 4/1988 | Fujiwara et al. | 428/209 |
| 4,879,450 A * | 11/1989 | Valentin et al. | 219/121.64 |
| 4,916,284 A * | 4/1990 | Petrick | 219/121.64 |
| 5,096,518 A * | 3/1992 | Fujikawa et al. | 156/89.28 |
| 5,131,710 A * | 7/1992 | Kamiguchi et al. | 296/76 |
| 5,609,288 A * | 3/1997 | Johnson | 228/157 |
| 5,613,726 A * | 3/1997 | Hobbs et al. | 296/186.1 |
| 5,776,624 A * | 7/1998 | Neutzler | 429/437 |
| 6,174,932 B1 | 1/2001 | Pachl et al. | |
| 6,193,833 B1 * | 2/2001 | Gizowski et al. | 156/272.8 |
| 6,291,792 B1 * | 9/2001 | Fussnegger et al. | 219/118 |
| 6,394,162 B2 * | 5/2002 | Gizowski et al. | 156/359 |
| 6,432,307 B2 * | 8/2002 | Gizowski et al. | 210/321.6 |
| 6,599,954 B1 * | 7/2003 | Hayashi et al. | 522/25 |
| 6,872,911 B2 * | 3/2005 | Weiblen et al. | 219/121.64 |
| 6,974,648 B2 * | 12/2005 | Goebel | 429/434 |
| 7,009,136 B2 * | 3/2006 | Schlag | 219/121.64 |
| 7,009,149 B2 * | 3/2006 | White et al. | 219/432 |
| 7,368,035 B2 * | 5/2008 | Wang et al. | 156/304.3 |
| 7,470,487 B2 * | 12/2008 | Tomimoto et al. | 429/169 |
| 7,784,165 B2 * | 8/2010 | Xiao et al. | 29/447 |
| 7,820,947 B2 * | 10/2010 | Gaynor et al. | 219/442 |
| 7,823,277 B2 * | 11/2010 | Keyser et al. | 29/843 |
| 8,110,062 B2 * | 2/2012 | Asada et al. | 156/272.8 |
| 8,431,872 B2 * | 4/2013 | Chang | 219/441 |
| 8,568,940 B2 * | 10/2013 | Newman et al. | 429/507 |
| 8,753,463 B2 * | 6/2014 | Fuchs et al. | 156/91 |
| 8,821,675 B2 * | 9/2014 | Wei et al. | 156/257 |
| 2004/0041006 A1 | 3/2004 | Masingale | |
| 2004/0182836 A1 * | 9/2004 | Becker et al. | 219/121.64 |
| 2006/0127706 A1 * | 6/2006 | Goebel et al. | 429/12 |
| 2007/0044907 A1 * | 3/2007 | Hatase et al. | 156/272.8 |
| 2008/0223735 A1 * | 9/2008 | Ishikawa et al. | 206/6 |
| 2009/0229474 A1 * | 9/2009 | Hsu | 99/332 |
| 2009/0272488 A1 * | 11/2009 | Ogasawara | 156/280 |
| 2013/0036917 A1 * | 2/2013 | Berge | 99/344 |

FOREIGN PATENT DOCUMENTS

| | | | | |
|---|---|---|---|---|
| GB | 2273070 A | 6/1994 | | |
| JP | H2-28361 U | 2/1990 | | |
| JP | 2001-191968 | 7/2001 | | |
| JP | 2001-191968 A | 7/2001 | | |
| JP | 2001-193715 A | 7/2001 | | |
| JP | 2001191968 A | 7/2001 | | |
| JP | 2001193715 A * | 7/2001 | | F16B 5/08 |
| JP | 2006-161046 A | 6/2006 | | |
| JP | 2006-170232 A | 6/2006 | | |

OTHER PUBLICATIONS

English translation of the Notice of Reasons for Rejection with mailing date of May 10, 2011; Japanese Patent Application No. 2007-085401.

* cited by examiner

JOINING STRUCTURE AND METHOD OF METAL WORKS

BACKGROUND OF THE INVENTION

The present invention relates to a joining structure and method of metal works, and relates to a joining structure and method of metal works in which a panel is joined to a vehicle body of a vehicle, for example.

In an automotive-vehicle manufacturing factory, for example, a welding technology, such as a spot welding or a laser welding, has been applied to join a sheet metal, such as a floor panel, to a vehicle body.

Japanese Patent Laid-Open Publication No. 2001-191968, for example, discloses a technology in which a thermosetting adhesive tape is used together with the laser welding in order to cover up weak points of the welding. That is, the thermosetting adhesive tape is previously applied to a joining portion of works and the works are joined provisionally with this tape, and then the laser welding is applied to the works and the thermosetting adhesive tape is cured by a heat of the laser welding at the same time, thereby joining the works firmly.

The above-described technology, however, has a problem in that since the thermosetting adhesive tape needs to be cured by using the heat of the laser welding, a location of application of this applied tape would be limited to a particular one in the vicinity of laser-welding applied portions.

SUMMARY OF THE INVENTION

The present invention has been devised in view of the above-described problem, and an object of the present invention is to provide a joining structure and method of metal works that can have less limitation in a joining location.

According to the present invention, there is provided a joining structure of metal works, comprising a pair of metal works, the metal works being configured to provide a gap at joining faces thereof when the metal works contact one another for joining, an adhesive agent having a chain-reacting curing reaction function, the adhesive agent being disposed within the gap provided at the joining faces of the metal works contacting, and a welding portion, to which a welding is applied, the welding portion being located adjacently to the gap so that an energy from the welding applied generates a heat of curing reaction within the adhesive agent autogenously, wherein the pair of metal works are joined together by the welding applied to the welding portion and the adhesive agent that is cured at least by the autogenously-generated curing reaction heat caused by the welding and an additional heat that is successively generated by the autogenously-generated curing reaction heat within the adhesive agent due to the chain-reacting curing reaction function of the adhesive agent.

According to the present invention, since the metal works are joined by the welding and the adhesive agent having the chain-reacting curing reaction function, the adhesive agent is cured by the energy from the welding properly, so that the joining of the metal works can be obtained rapidly and with energy-saving. Herein, the adhesive agent having the chain-reacting curing reaction function is, as disclosed in U.S. Pat. No. 6,599,954, for example, a resin composition that primarily comprises a photopolymerizable resin, a photo- and thermopolymerization initiator, and a photopolymerization initiator. Herein, when this adhesive agent is exposed to energy radiation, such as ultraviolet radiation, electron beam, X-rays, infrared radiation, sunlight, visible light, laser beam (e.g., excimer laser, $CO_2$ laser), radiated heat rays, and other energy such as heat, a cation and a (first) heat of curing reaction are positively generated within the resin composition of the adhesive agent, and the curing reaction is further effected, like a chain reaction, by the action of the cation and the (first) heat of curing reaction to successively generate an additional cation and an additional (second) heat of curing reaction, so that the resin composition of the adhesive agent is cured by means of the (first and second) reaction heat energies and the cation. By using this adhesive agent having the chain-reacting curing reaction function, the thickness of the metal works to be joined can be reduced as much as possible, and a weight reduction and a cost reduction of products can be attained. That is, the joining portions can be made properly continuous by applying the adhesive agent having the chain-reacting curing reaction function, so that the rigidity of the joining portions can be improved. This rigidity improvement can cause the above-described thinner thickness of the metal works and thereby the reductions of weight and costs. Further, a secular deterioration of a joining portion with the adhesive agent can be properly restrained by the welding portion. Meanwhile, a joining area can be properly enlarged by the adhesive agent having the chain-reacting curing reaction function. Thus, the both can cover respective deficiencies, thereby providing a properly firm joining structure. The metal works to be joined eventually may comprise two members, three members or more.

According to an embodiment of the present invention, the gap is formed by an originally-provided uneven shape of the metal work. Thereby, the originally-provided uneven shape of the metal work is utilized as the gap for application of the adhesive agent having the chain-reacting curing reaction function, without making any gap for the adhesive agent particularly. Accordingly, the firm joining structure can be obtained easily. The metal work with the originally-provided uneven shape may be made by injection molding, casting, pressing or the like.

According to another aspect of the present invention, there is provided a joining method of metal works, comprising the steps of providing a pair of metal works, the metal works being configured to provide a gap at joining faces thereof when the metal works contact one another for joining, the gap being provided by forming at least one of joining faces of the metal works in an uneven shape, disposing an adhesive agent having a chain-reacting curing reaction function within the gap provided at the joining faces of the metal works contacting, radiating a laser beam for a laser welding, by a leaser-beam radiation device, at a welding portion that is located adjacently to the gap, where the metal works contact one another substantially directly, and applying an energy from the laser beam radiated by the laser-beam radiation device to the adhesive agent within the gap so as to generate a heat of curing reaction within the adhesive agent autogenously, wherein the pair of metal works are joined together by the laser welding applied to the welding portion and the adhesive agent that is cured at least by the autogenously-generated curing reaction heat caused by the laser beam and an additional heat that is successively generated by the autogenously-generated curing reaction heat within the adhesive agent due to the chain-reacting curing reaction function of the adhesive agent.

According to the above-described aspect of the present invention, by forming the joining face in the uneven shape, the metal works contact one another partially so as to provide the gap between the metal works. The adhesive agent having the chain-reacting curing reaction function within the gap is disposed previously, and the metal works are placed so as to contact one another. Then, the laser beam is radiated and thereby the welding portion, where the metal works contact one another substantially directly, are joined together with the laser welding. Meanwhile, the adhesive agent having the chain-reacting curing reaction function provided in the gap is cured by the heat energy generated by the energy from the laser beam radiated in the chain reaction manner, or the combination of this heat energy generated in the chain reaction manner and the energy itself of the laser beam, which is as described above in the present invention. As a result, even if the laser welding is used in which the radiation of the leaser beam is partial, the properly continuous joining portion can be provided by using the cured adhesive agent. Thus, it may not necessary to use a large-scaled forming device or drying device, so that manufacturing costs can be reduced properly. Further, since the welding portion where the metal works contact one another substantially directly is provided adjacently to the gap provided by forming the joining faces of the metal works in the uneven shape, the joining area of the welding portion can be made small so as to increase contacting pressure properly at this portion, so that the metal works can be placed properly so as to contact one another with little gap therebetween at this welding portion. As a result, the proper and accurate laser welding can be obtained by preventing poor welding. Any kind of metal works or metal-alloy works may be used as long as the laser welding can be applied to them. The welding portion where the metal works contact one another substantially directly may be configured so that there occurs a considerably small gap between the metal works compared to the gap that accommodates the adhesive agent having the chain-reacting curing reaction function.

According to an embodiment of the above-described aspect of the present invention, the gap that accommodates the adhesive agent having the chain-reacting curing reaction function is provided by forming at least one of joining faces of the metal works in a recess shape. Thereby, the disposition of the adhesive agent can be facilitated. Particularly, in a case where the adhesive agent is coated or injected, the adhesive agent remains in the recess properly, so that the application of the adhesive agent can be facilitated.

According to another embodiment of the above-described aspect of the present invention, at least one of the metal works has a projecting portion for accommodating the adhesive agent therein that is formed so as to project outward from the welding portion thereof, and the laser beam radiation device is located on a projection side of the projecting portion of the metal work and controlled so as to radiate the laser beam at the projecting portion accommodating the adhesive agent, focusing on the welding portion. Thereby, the welding portion where the metal works contact one another substantially directly can be properly welded with the laser beam, while the projecting portion with the adhesive agent is exposed to the laser beam that has a weaker energy than the laser beam applied to the welding portion. Thus, both the laser welding and the curing of the adhesive agent having the chain-reacting curing reaction function can be attained substantially at the same time.

The laser beam radiated by the laser-beam radiation device is configured so that the amount of heat applied to the welding portion for welding is greater than that applied to the adhesive agent for curing the adhesive agent.

According to an embodiment of the above-described configuration of the laser beam, the configuration is provided by controlling the laser beam so as to focus on the welding portion of the metal work and not to focus on a gap portion of the metal work that accommodates the adhesive agent.

According to another embodiment of the above-described configuration of the laser beam, the configuration is provided by differentiating the amount of output energy of the laser beam radiated from one another for the welding portion and a gap portion of the metal work that accommodates the adhesive agent.

According to further another embodiment of the above-described configuration of the laser beam, the method including a step of moving the laser beam continuously along a specified moving direction so that the welding portion of the metal work and a gap portion of the metal work that accommodates the adhesive agent are exposed to radiation of the laser beam, wherein the configuration of the laser beam is provided by differentiating the speed of moving of the laser beam from one another for the welding portion and the gap portion of the metal work.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
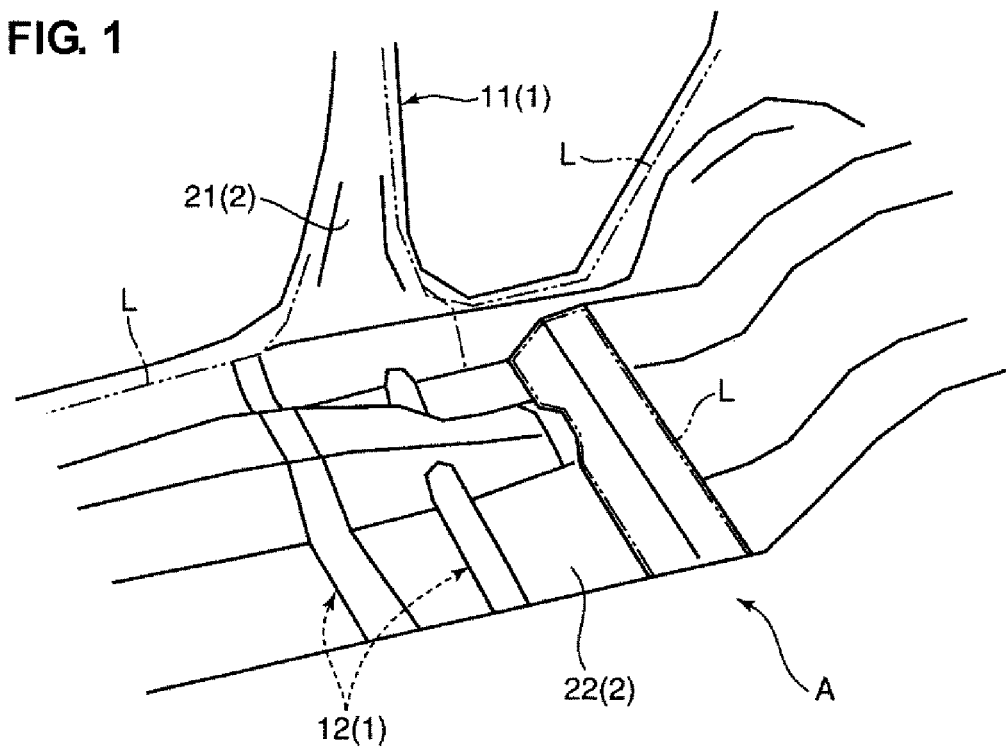
FIG. 1 is a perspective view showing a major part of an underbody of a vehicle to which an embodiment according to the present invention is applied.
Figure 2:
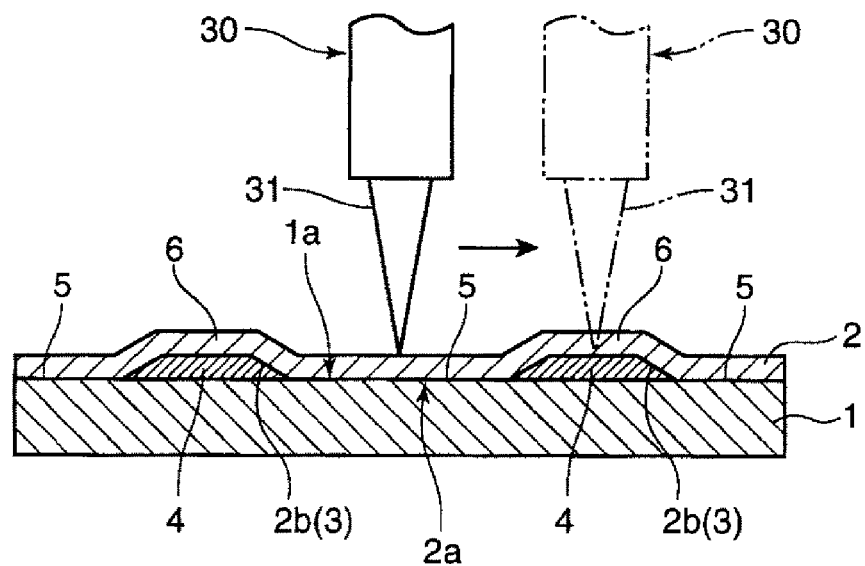
FIG. 2 is a schematic sectional view describing a joining structure of metal works according to the embodiment of the present invention.
Figure 3:
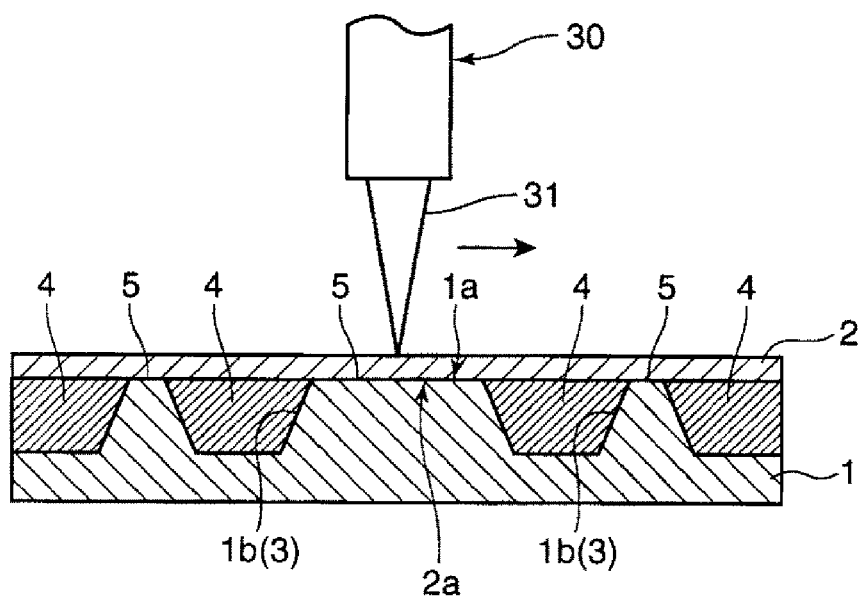
FIG. 3 is a schematic sectional view describing another joining structure of metal works according to the embodiment of the present invention.

FIG. 1 is a perspective view showing a major part of an underbody of a vehicle to which an embodiment according to the present invention is applied, and FIGS. 2 and 3 are schematic sectional views describing joining structures of metal works according to the embodiment of the present invention.

Referring to FIG. 1, an underbody A comprises shells 1 and panels 2, which are joined together. Specifically, the shell 1 is a structure member, such as a center pillar (B pillar) 11, a floor cross member 12, and the like, and the panel 2 is a panel, such as a pillar panel 21, a floor panel 22, an outer panel, and the like.

As shown in FIGS. 2 and 3, the shell 1 and the panel 2 have joining faces 1a, 2a, at least one of which is formed in an uneven shape. Recess portions 1b, 2b that are formed by the uneven shape constitute a gap 3 that is provided at the joining faces 1a, 2a of the both members 1, 2 that contact one another. Further, within the gap 3 is disposed an adhesive agent 4 having a chain-reacting curing reaction function, which can be cured by an autogenously-generated curing reaction heat that is caused by an outer-applied energy like a chain reaction. A welding portion 5 where the both members 1, 2 contact one another substantially directly is welded by a laser beam 31, and further the both members 1, 2 are joined by the adhesive agent 4 having the chain-reacting curing reaction function that is disposed within the gap 3. Herein, the above-described welding portion 5 is located adjacently to the gap 3.

As apparent from FIGS. 2 and 3, the gap 3 accommodating the adhesive agent 4 is provided by forming at least one of joining faces 1a, 2a of the shell 1 and the panel 2 works in a recess shape, and the adhesive agent 4 is preferably disposed within the recess portions 1b, 2b so as to join the both members. In this case, the disposition of the adhesive agent 4 is facilitated. Particularly, in a case where the adhesive agent 4 is coated or injected, the adhesive agent 4 remains in this recess portion 1b, 2b properly, so that the application of the adhesive agent 4 in the recess portions 1b, 2b can be facilitated.

As joining manners of the shell 1 and the panel 2, a manner shown in FIG. 2, another manner shown in FIG. 3, and the combination of these manners may be preferable.

In the manner shown in FIG. 2, the panel 2 is made by pressing so as to be formed in the uneven shape. Thus, when the panel 2 contacts the shell 1, the recess portion 2b forms the gap 3 between the both members 1, 2. The adhesive agent 4 is disposed within the gap 3. The welding portion 5 where the both members 1, 2 contact one another substantially directly is welded by the laser beam 31 that is controlled so as to move along a moving path for welding L. The welding portion where the shell 1 and the panel 2 contact one another substantially directly may be configured so that there occurs a considerably small gap between the both members compared to the above-described gap 3. Further, the panel 2 having the above-described uneven shape may be the one that has such uneven shape originally, or such uneven shape of the panel 2 may be made later on purpose for the disposition of the adhesive agent.

In another manner shown in FIG. 3, the panel 2 is made by pressing so as to be formed in a flat shape. Meanwhile, the shell 1 is configured to have plural recess portion 1b to form the gap 3 for the adhesive agent 4 at the joining face 1a. Herein, likewise, the recess portions 1b may be the one that is originally formed, or it may be made later on purpose for the disposition of the adhesive agent 4.

Figure 4:
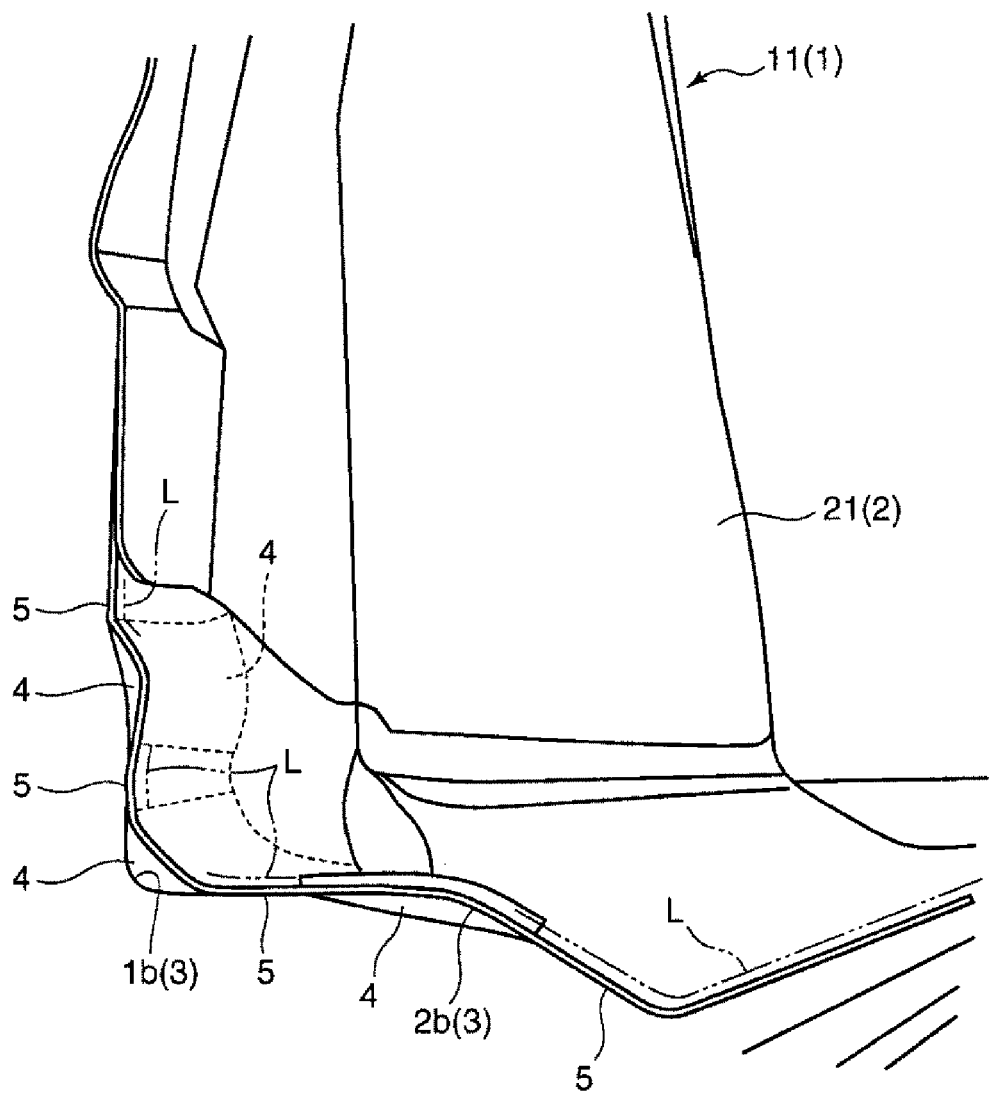
FIG. 4 is a perspective view showing the major part of the underbody of the vehicle that shows the embodiment of the present invention.
Figure 5:
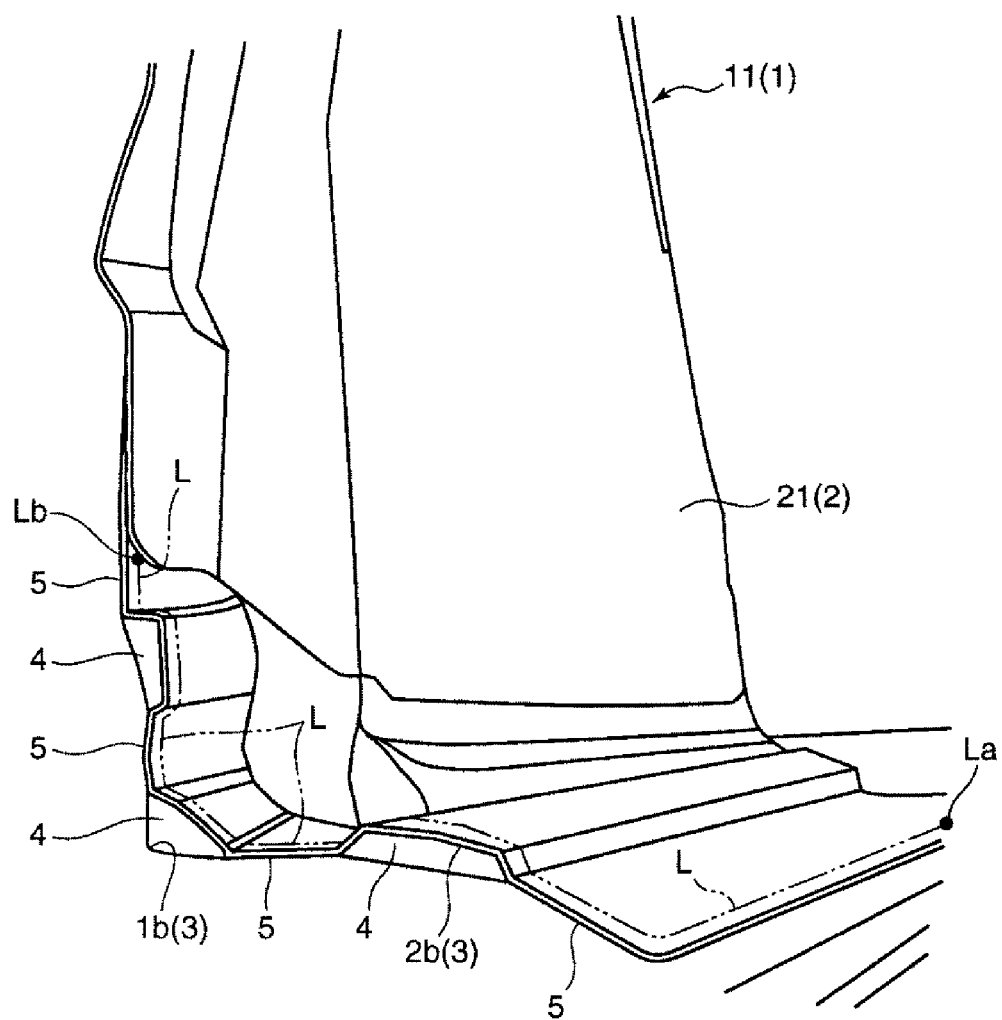
FIG. 5 is a perspective view showing the major part of the underbody of the vehicle that shows the embodiment of the present invention.

Herein, the manner of the combination of those shown in FIGS. 2 and 3 is the one where the gap 3 formed by the recess portion 1b of the shell 1 and the gap formed by the recess portion 2b of the panel 2 are combined (specifically, the manner shown in FIGS. 4 and 5).

The adhesive agent 4 is a resin composition that primarily comprises a photopolymerizable resin (mainly, epoxy resin, and preferably alicyclic epoxy resin), a photo- and thermopolymerization initiator (e.g., aromatic sulfonium salt), and a photopolymerization initiator (e.g., sulfonium salt). Herein, when this adhesive agent is exposed to energy radiation, such as ultraviolet radiation, electron beam, X-rays, infrared radiation, sunlight, visible light, laser beam (e.g., excimer laser, $CO_2$ laser), radiated heat rays, and other energy such as heat, a cation and a (first) heat of curing reaction are positively generated within the resin composition of the adhesive agent, and the curing reaction is further effected, like a chain reaction, by the action of the cation and the (first) heat of curing reaction to successively generate an additional cation and an additional (second) heat of curing reaction, so that the resin composition of the adhesive agent is cured by means of the (first and second) reaction heat energies and the cation. The coating thickness of the adhesive agent 4 is preferably 0.01-10 mm, and the coating width is preferably 1.0-30 mm. The curing conditions of the adhesive agent 4 is to radiate energy beams that can give a heat of 100 degrees centigrade or greater.

Next, the joining method for obtaining the joining structure shown in FIGS. 1 through 3 will be described.

A plurality of works (shell 1, panel 2) with the gap 3 are manufactured, the adhesive agent 4 is applied (coated) to the recess portions 1b, 2b forming the gap 3, the works are temporarily supported by a jig or the like in a state where their joining faces contact one another, and the laser beam 31 is radiated at one of the works in such a manner that it moves at a specified speed.

The moving and radiation step of the laser beam 31 is carried out by a known laser moving-radiation device 30. This device 30 is programmed so as to move along the specified moving path (coordinates) L (see FIG. 1) at a specified moving speed. The specified moving speed of the laser beam 31 may be set to be 0-10 m/min for the welding at the welding portion 5, while it is set to be 10-20 m/min for the above-described curing condition.

Exemplified manners of the moving and radiation of the laser beam 31 are shown in FIGS. 4 and 5. FIGS. 4 and 5 are perspective views showing major parts of the underbody of the vehicle that show respective manners of the moving and radiation of the laser beam 31 according to the embodiment of the present invention. The adhesive agent 4 is applied to the recess portions 1b of the center pillar 11 and the floor member 12 and the recess portions 2b of the pillar panel 21 previously before the vehicle coating step, and these are temporarily supported by jigs, not illustrated. To these portions are applied the laser beam 31.

According to the manner shown in FIG. 4, the pillar panel 21 is formed in the uneven (wavy) shape shown in the figure from its original design. Further, the moving path L of the laser beam 31 is configured so that its portion where the shell 1 and the panel 2 contact one another substantially directly (welding portion 5) is comprised of a continuous line, while its another portion where the gaps 3 are provided is comprised of a discontinuous stitch-shaped line that is long enough to cause starting of the curing reaction of the adhesive agent 4 within the gaps 3.

According to the manner shown in FIG. 5, the pillar panel 21 is formed in an angular-uneven shape for changing a focal position of the laser beam 31 as shown in the figure. Further, the moving path L of the laser beam 31 is configured so that its whole portion is comprised of a continuous line from one end La to the other end Lb.

In the both manners describe above, the welding portion 5 where the center pillar 11, floor member 12 and the pillar panel 21 contact one another substantially directly can be joined firmly by the laser welding, and the portions with the gaps 3 can be joined firmly by the adhesive agent 4.

Further, it may be preferable, as shown in FIG. 2, that at least one of the metal works (the panel 2 in an example illustrated) has a projecting portion 6 for accommodating the adhesive agent 4 that is formed so as to project outward from the welding portion (laser welding portion) 5, and the laser beam radiation device 30 is located on a projection side of the projecting portion 6 of the work (panel 2 in the example illustrated) and controlled so as to radiate the laser beam 31 at the projecting portion 6 accommodating the adhesive agent 4, focusing on the welding portion 5. Thereby, the welding portion 5 can be properly welded with the laser beam 31, while the projecting portion 6 with the adhesive agent 4 is exposed to the laser beam 31 that has a weaker energy than the laser beam 31 applied to the welding portion 5. Thus, both the laser welding and the curing of the adhesive agent 4 having the chain-reacting curing reaction function can be attained substantially at the same time.

As described above, in the joining structure of the metal works according to the embodiment of the present invention, since the shell 1 and the panel 2 as the metal works are joined by the welding at the welding portion 5 and the adhesive agent 4, the adhesive agent 4 is cured by the energy from the welding, so that the joining of the metal works can be obtained rapidly and with energy-saving.

As a result, the thickness of the shell 1 and the panel 2 to be joined can be reduced as much as possible, and a weight reduction and a cost reduction of products can be attained. That is, the joining portions can be made properly continuous by applying the adhesive agent 4, so that the rigidity of the joining portions can be improved. This rigidity improvement can cause the above-described thinner thickness of the shell 1 and the panel 2 and thereby the reductions of weight and costs. Further, a secular deterioration of the joining portion with the adhesive agent 4 can be properly restrained by the welding portion 5. Meanwhile, the joining area can be properly enlarged by the adhesive agent 4. Thus, the both can cover respective deficiencies, thereby providing the properly firm joining structure.

Further, the originally-provided uneven shape of the shell 1 or the panel 2 may be utilized as the gap 3 for application of the adhesive agent 4, without making any gap for the adhesive agent 4 particularly. In this case, the firm joining structure can be obtained easily. The metal work (panel 2) with the originally-provided uneven shape may be made by injection molding, casting, pressing or the like.

Also, according to the present embodiment, since the metal works are the shell 1 and the panel 2 that constitute the underbody A of the vehicle, the adhesive agent 4 disposed between the shale 1 and the panel 2 performs a vibration absorption function to the vehicle. As a result, there can be provided a comfortable circumference of a vehicle compartment. Further, since the joining strength of the panel is increased, the thickness of the panel 2 can be reduced as much as possible, and the weight reduction and the cost reduction of products can be attained.

Further, according to the joining method of the present embodiment of the present invention, by forming at least one of the joining faces 1a, 2a of the shell 1 and the panel 2 in the uneven shape, the shell 1 and the panel 2 contact one another partially so as to provide the gap 3 between the both. The adhesive agent 4 is disposed previously within the recess portions 1b, 2b forming the gap 3, and the both members 1, 2 are placed so as to contact one another. Then, the laser beam 31 is radiated and thereby the welding portion 5 where the both members 1, 2 contact one another substantially directly, are joined with laser welding. Meanwhile, the adhesive agent 4 in the gap 3 is cured by the heat energy generated by the energy from the laser beam 31 radiated in the chain reaction manner, or the combination of this heat energy generated in the chain reaction manner and the energy itself of the laser beam 31. As a result, even if the laser welding is used in which the radiation of the leaser beam 31 is partial, the properly continuous joining portion can be provided by using the cured adhesive agent 4. Thus, it may not necessary to use a large-scaled forming device or drying device, so that manufacturing costs can be reduced properly. Further, since the welding portion 5 where the shell 1 and the panel 2 contact one another substantially directly is provided adjacently to the gap 3 provided by forming the joining faces of the shell 1 and the panel 2 in the uneven shape, the joining area of the welding portion 5 can be made small so as to increase contacting pressure properly at this portion, so that the shell 1 and the panel 2 can be placed properly so as to contact one another with little gap therebetween at this welding portion 5. As a result, the proper and accurate laser welding can be obtained by preventing poor welding. Also, since the adhesive agent 4 is used, there can be less limitations to positions or shapes of the welding and adhesion. Further, since there is no need of a peeling-off work or the like, the joining method can be made simpler. And, a high-quality productivity can be provided.

Thereby, the welding portion 5 where the shell 1 and the panel 2 contact one another substantially directly can be properly welded with the laser beam 31, while the projecting portion of the gap 3 can be joined by the adhesive agent 4. Thus, both the laser welding and the curing of the adhesive agent 4 can be attained substantially at the same time. Thus, the joining products having a high quality can be manufactured with the easy method.

The above-described embodiment just shows an exemplified preferred embodiment, and the present invention should not be limited to this embodiment.

Herein, the pair of metal works of the present invention includes the combination of either one of the center pillar 11 and floor member 12 and the pillar panel 21.

Any kind of metal works or metal-alloy works may be used as the shell 1 and the panel 2 as long as the laser welding can be applied to them.

The welding portion 5 where the shell 1 and the panel 2 contact one another substantially directly may be configured so that there occurs a considerably small gap between them compared to the gap 3.

Although the shell 1 and the panel 2 are exemplified, the metal works to be joined eventually may comprise two members, three members or more.

The shell 1 and the panel 2 that have the originally-provided uneven shape may be made by injection molding, casting, pressing or the like.

What is claimed is:

1. A joining method of metal works, in which a pair of metal works are joined together without any other metal member interposed between the pair of metal works, the joining method comprising:

providing a pair of metal works, at least one of the pair of metal works having a projecting portion projecting outward, the pair of metal works being configured to provide at least two direct contact portions where joining faces thereof directly contact one another and a gap portion which is positioned between said two direct contact portions when the pair of metal works are set to contact one another for joining, said gap portion being formed by said projecting portion between the pair of metal works;

disposing an adhesive agent having a chain-reacting curing reaction function within said gap portion formed by the projecting portion between the pair of metal works contacting, said adhesive agent having the chain-reacting curing reaction function producing an autogenously-generated curing reaction heat therein when receiving a heat from outside;

radiating, by using a laser-beam radiation device, a laser beam to weld a welding portion which includes said two direct contact portions of the pair of metal works and not said gap portion formed by the projecting portion which is filled with said adhesive agent;

moving said laser beam, by moving the leaser-beam radiation device, continuously along a moving path that extends continuously from one of said two direct contact portions to the other of the two direct contact portions across said gap portion formed by the projecting portion, and focusing the laser beam on the two direct contact portions and not on said adhesive agent disposed within the gap portion formed by the projecting portion; and applying an energy from said laser beam radiated by the laser-beam radiation device directly not only to said welding portion including the two direct contact portions of the pair of metal works but also to said adhesive agent disposed within the gap portion formed by the projecting portion between the pair of metal works such that the adhesive agent receives heat directly from the laser-beam energy directly applied thereto so as to generate heat for curing reaction within the adhesive agent autogenously, wherein the laser beam radiated by the laser-beam radiation device is configured, by said focusing of the laser beam on the two direct contact portions and not on the adhesive agent disposed within the gap portion formed by the projecting portion, such that the amount of heat applied to the welding portion including the two direct contact portions for welding is greater than that applied to the adhesive agent for curing the adhesive agent, whereby the pair of metal works are joined together via said welding portion to which the laser welding is applied and by said gap portion filled with cured adhesive which provides additional rigidity to the welded pair of metal works and performs vibration absorption function.

* * * * *